US006304966B1

United States Patent
Shimizu

(10) Patent No.: US 6,304,966 B1
(45) Date of Patent: Oct. 16, 2001

(54) DATA HIDING METHOD AND SYSTEM USING STATISTICAL PROPERTIES

(75) Inventor: Shuichi Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/999,470

(22) Filed: Dec. 29, 1997

(30) Foreign Application Priority Data

Dec. 25, 1996 (JP) .................................................... 8-345568

(51) Int. Cl.⁷ ....................................................... G06F 1/00
(52) U.S. Cl. ............................................................. 713/100
(58) Field of Search ................................................ 713/100

(56) References Cited

PUBLICATIONS

"Applications of Toral Automorphisms in Image Watermarking" Proceedings of the Int'l Conf. on Image Processing, Sep. 1996.*

"Transparent Robust Image Watermarking" Proceedings of the Singapore Int'l Conf. on Image Processing, Sep. 1996.*

* cited by examiner

Primary Examiner—Mark R. Powell
(74) Attorney, Agent, or Firm—Ronald L. Drumheller

(57) ABSTRACT

A data hiding method enables embedded information to be extracted without providing original media data as information and enables the information to be extracted with relatively low calculation cost. The data hiding method embeds information indicating a specific meaning into a media array expressing media data, the media array comprising a plurality of array elements, the method including the steps of:

(a) preparing a pattern array having a plurality of array elements, the pattern array having at least a positive unit value and a negative unit value, and the sum total of the positive and negative unit values being zero;

(b) specifying (N) number of hiding regions in the media array, the hiding region having a size corresponding to that of the pattern array;

(c) determining an amount of operation for each of the array elements according to the locationally corresponding positive or negative unit value with respect to one of the hiding regions, by referring to a hiding rule providing the correspondence between the meaning of information and an application of the pattern array to the hiding region;

(d) adding the determined amount of operation to each of the array elements with respect to the hiding region; and (e) performing the steps (c) to (d) with respect to the (N) number of the hiding regions so that information is embedded into (N) number of the hiding regions.

6 Claims, 12 Drawing Sheets

DCT : DISCRETE COSINE TRANSFORM
ID : IDENTIFICATION

PATTERN ARRAY P 4 x 4 PIXELS $0 \leq (i,j) \leq 3$ $$F(1,1) = \sum_{i,j} (I'(1+i, 1+j) \times P(i,j))$$

$$F(1,1) = a'_{11} - a'_{31} - a'_{22} - a'_{42} - a'_{13} - a'_{33} - a'_{24} - a'_{44}$$

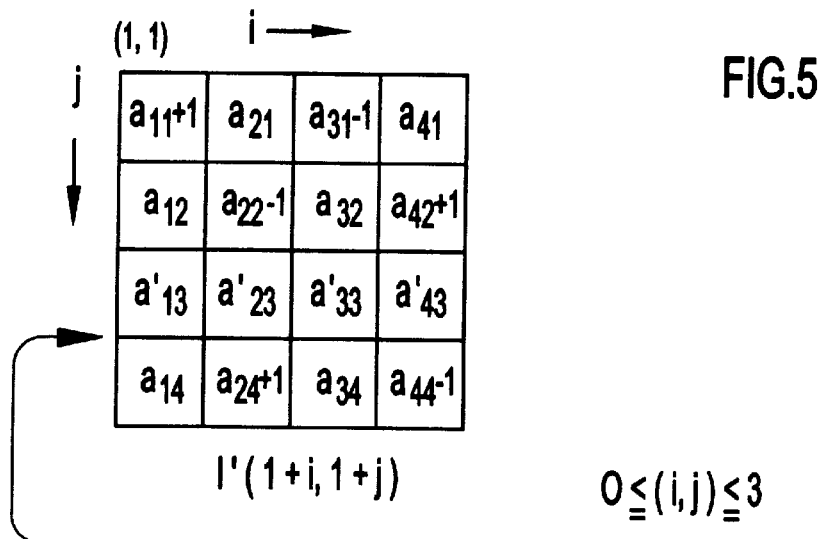
FIG.5
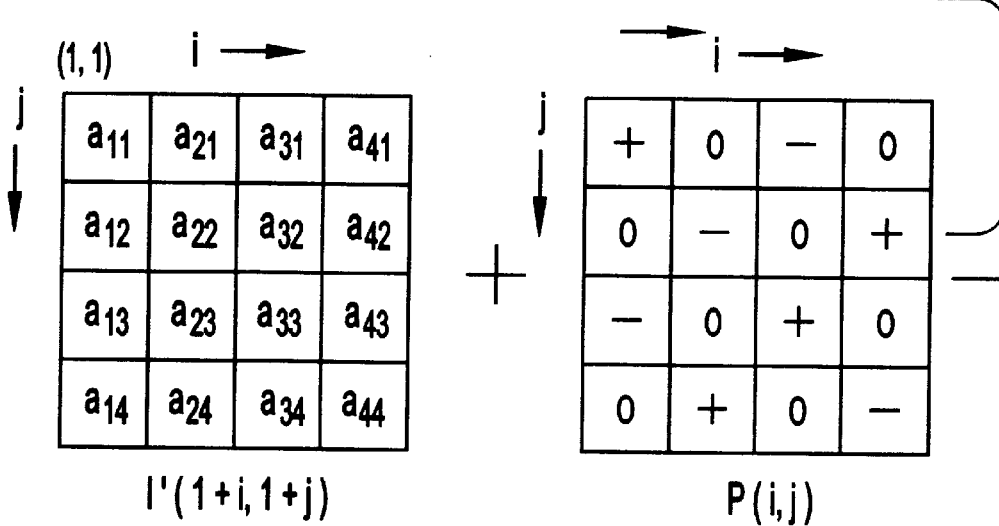
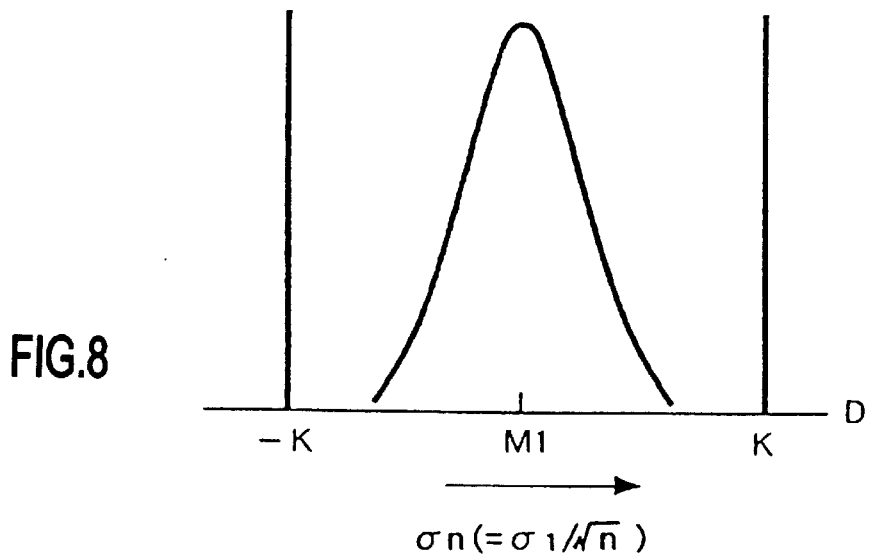
FIG.8

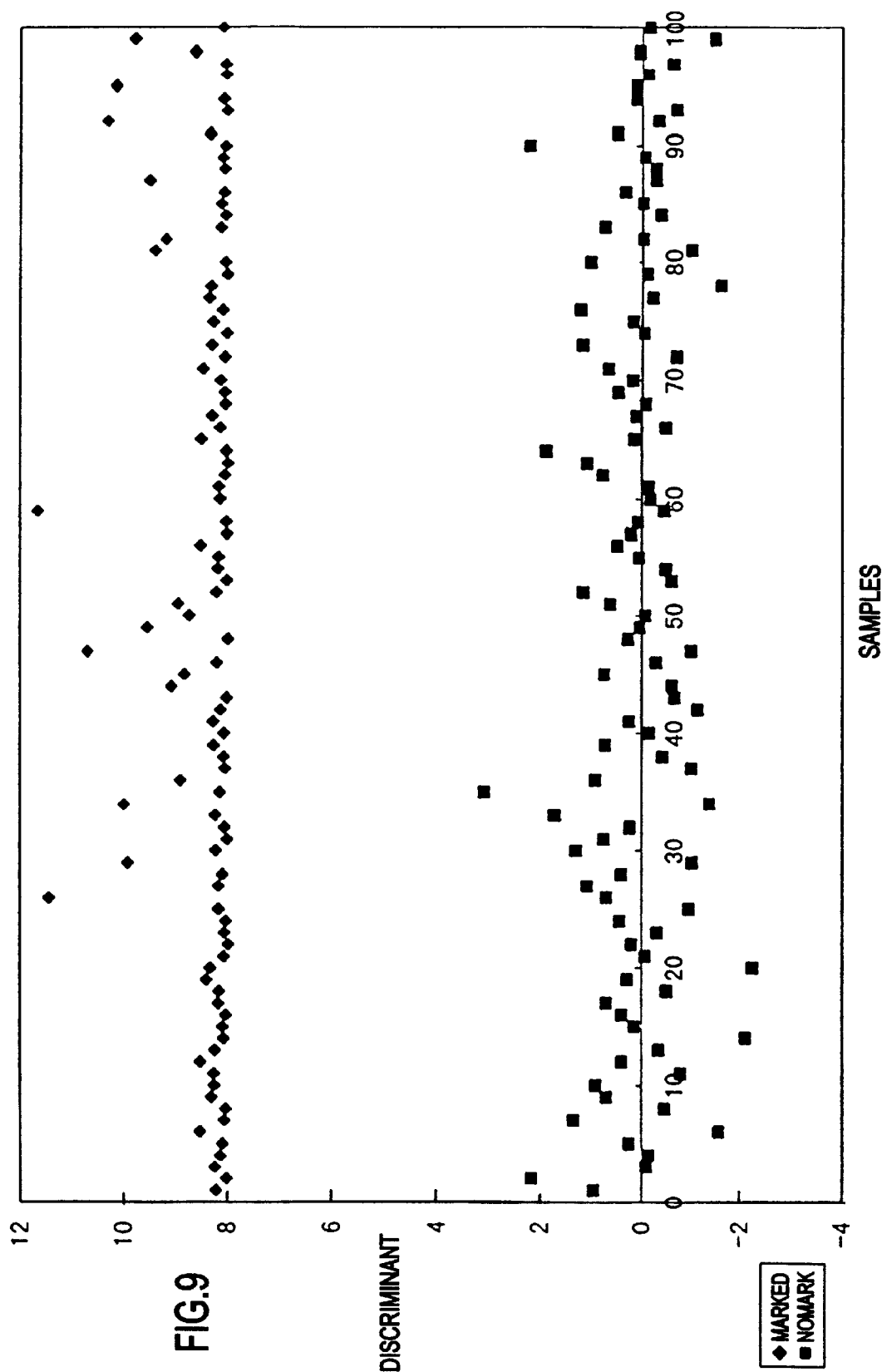

DATA HIDING METHOD AND SYSTEM USING STATISTICAL PROPERTIES

BACKGROUND OF THE INVENTION

1. Field of the Invention

The present invention relates to a method for "data hiding", i.e., a technology to embed information into data, and method for "extracting" the embedded information.

2. Related Art

As a new medium called a DVD is being more and more widely used, it is expected that more and more amount of image and/or audio information is distributed through such medium. Since these digitized information can be easily and perfectly copied by everyone without any deterioration, it is an issue in defining the detailed specification of DVD how to prevent abuse and to protect its copyright. Thus, in order to prevent a third party from illegally copying such information (data), a technology is attracting attention for hiding information into the original data. Such hiding technology is called "data hiding."

Data hiding is a generic term of technology for embedding information into another medium (still images, audio, movies, etc.). It is, unlike encryption, intended not to keep secret information contained in a medium, but to integrate information contained in a medium with information to be embedded.

One of significant features of the data hiding lies in that it is invisible marking. When information is embedded into a medium, it is not added with data bits, but is processed so that it cannot be perceived by human vision (data transformation). Thus, there is no increase in the amount of data due to embedding of additional information. For example, when text or audio information is embedded into an image, only one type of medium could be handled on storage. Another significant feature includes indivisibility of embedded information. Since the data hiding directly embeds the additional information into a data structure of the medium, not in a header or a separate file, the embedded information can be extracted even if the platform or data format of the medium is varied as long as the quality of original data is saved.

With the data hiding technology, it is possible to embed, for example, copy-control information as message data indicating whether or not the data is allowed to be copied. It is possible to arrange a DVD player in such a manner that, when it accesses the media data recorded, it extracts the copy-control information, and, if the information inhibits copying, operates to inhibit the copying operation. Thus, it becomes possible to effectively control copying of data in an ordinary household by providing for the DVD player a mechanism for extracting the embedded information so as to extract and analyze the embedded information simultaneously when accessing the data on the recording medium.

"Nikkei Electronics 4-22, 1996" published on Apr. 22, 1996 discloses the following data hiding technology. FIG. 1 is a schematic diagram for illustrating data hiding and extraction of the background art. In the step for hiding ID information, a frequency spectrum is obtained by frequency converting original media information such as movies, still images, photos and audio with discrete cosine transform or fast Fourier transform. ID information is convoluted in the frequency spectrum of media information through spectrum spreading. The ID information is a random number unique to each purchaser of publication. Normal distribution is used as the algorithm for generating random numbers, with the length being 1000. Then, reverse frequency conversion is performed on the frequency spectrum of the media information added with the ID information to restore the digital publication hidden with the ID information. Although the ID information is hidden therein, the digital publication has little difference from the original so that the purchaser cannot visually recognize such difference.

On the other hand, to extract the ID information, it is necessary to have data on the original publication in addition to data on a digital publication which is assumed to be illegally copied. The obtained data and the original data are frequency converted to obtain their frequency spectra. Difference between these frequency spectra is determined, and compared with the ID information issued by the author. This enables it to identify the purchaser of the publication, so that it can be determined whether or not it is an illegal copy.

One of features of this technology is in use of a frequency space for hiding the data. That is, the media information is converted from a real space to the frequency space, and a frequency component in its frequency spectrum is manipulated on the basis of the ID information. Another feature is that the frequency region being utilized is local. That is, the spectrum spreading is conducted only on the low frequency region in the frequency spectrum of the media information without utilizing high frequency components in it. This is to prevent loss of ID information, which is caused in compressing/decompressing the ID information if it is spread to the high frequency region. In other words, this conventional approach is to locally spectrum spread the ID information in the frequency space of the media information, and to hide the ID information in the entire real space of the media information.

In the conventional approach described above, extraction of embedded information is allowed only when the original data is provided in conducting the extraction. However, information provided for a general-purpose DVD player is only information which is stored on an inserted storage medium, and which is processed for embedding, and additional information which is previously stored, for example, a ROM in the player (probably, standardized information for extraction). As long as the DVD player is a general-purpose device, it is practically impossible to separately provide original data when accessing individual data. Therefore, it is impossible to utilize the conventional approach for which holding of original data is prerequisite for the purpose of controlling copying in an ordinary household.

In addition, it is also necessary as a prerequisite for the utilization for the above purpose that the embedded information can be extracted simultaneously with access, and that the system operation can be controlled in real time. However, the conventional approach is difficult to meet such requirement because it needs enormous cost for frequency conversion or the like which is conducted in extracting the embedded information.

SUMMARY OF THE INVENTION

Then, the object of the present invention is to provide a data hiding method or system for embedding information into a recording medium so that information can be extracted without providing original data in extraction.

It is also intended to provide an extraction method or system enabling it to extract embedded information without providing original data.

It is also intended to provide a method or system enabling it to extract embedded information with relatively low calculation cost.

To attain the above object, the first aspect of the present invention provides a data hiding method for embedding information into a data array, the data array comprising a plurality of array elements, the method comprising the steps of:

(a) preparing a pattern array having a plurality of array elements, the pattern array having at least a positive unit value and a negative unit value, and the sum total of the positive and negative unit values being zero;

(b) specifying (N) number of hiding regions in the data array, the hiding region having a size corresponding to that of the pattern array;

(c) determining an amount of operation for each of the array elements according to the locationally corresponding positive or negative unit value with respect to one of the hiding regions, by referring to a hiding rule providing the correspondence between the meaning of information and an application of the pattern array to the hiding region;

(d) adding the determined amount of operation to each of the array elements with respect to the hiding region; and (e) performing the steps (c) to (d) with respect to the (N) number of the hiding regions so that information is embedded into (N) number of the hiding regions.

In addition, the second aspect of the present invention provides a method for extracting information embedded in a data array, the data array comprising a plurality of array elements, the method comprising the steps of:

(a) specifying (n) number of hiding regions in which information is embedded in the data array, the (n) number being sufficient to appear statistical character, the hiding region having a size corresponding to that of a pattern array, the pattern array having a plurality of array elements, and having at least a positive unit value and a negative unit value, the sum total of the positive and negative unit values being zero;

(b) calculating a block value by convoluting the pattern array to the hiding region with respect to each of the (n) number of the hiding regions, and obtaining a statistical judgment value from the sum of (n) number of block values; and (c) extracting embedded information according to the statistical judgment value by referring to an extracting rule providing a correspondence between the statistical judgment value and meaning of information which should be extracted.

BRIEF DESCRIPTION OF THE DRAWINGS

FIG. 5 is an operation for convoluting a pattern array P (i,j) on a hiding region expressed by I (1+i, 1+j).

FIG. 8 is a frequency distribution of statistical judgment values D when (n) number of blocks are randomly selected.

FIG. 9 is a graph showing statistical judgment values obtained by performing or not performing processing with a pattern array when signal processing is not performed.

DESCRIPTION OF THE PREFERRED EMBODIMENTS (1) Data Array I

Figure 2:
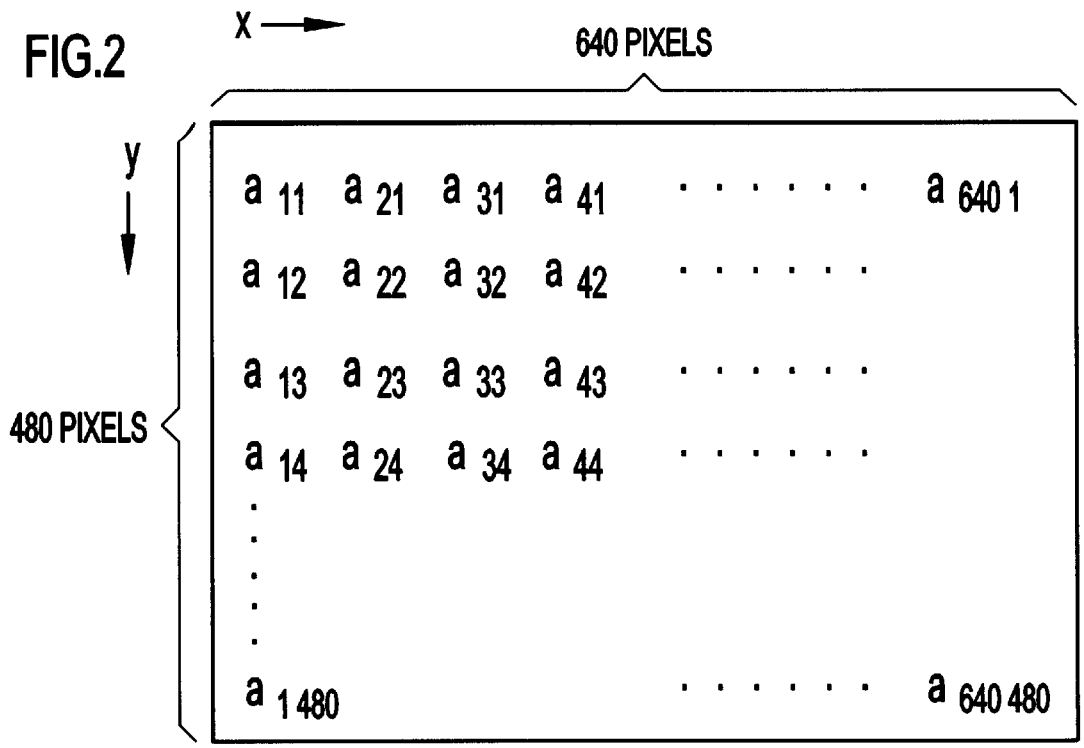
FIG. 2 is a state of one frame of a still image or movie consisting of 640×480 pixels.

Data is a subject into which information is embedded, and includes still image data, movie data, and audio data. The data is expressed by a data array I. The present invention can be applied to not only two-dimensional data such as still image data, but also to one-dimensional data such as audio data. In the following, description is given on an example where certain information is embedded into a still image or in one frame of movie image composed of 640×480 pixels as shown in FIG. 2. For the image data shown in the figure, a number of array elements $a_{xy}$ constituting the media array I are expressed as follows:

[Equation 1]

$$I(x, y):\{a_{11}, \ldots, a_{640\_1}, a_{21}, \ldots, a_{xy}, \ldots, a_{640\_480}\}$$

Here, (x, y) represents a position in the array, "x" being in the one-dimensional direction (lateral direction), "y" being in the two-dimensional direction (longitudinal direction). The image data of FIG. 2 has values in a range of $1 \leq x \leq 640$, $1 \leq y \leq 480$. The array element axy is a character value expressing features of the image data, for which direct parameters of the image such as pixel values, or indirect parameters such as average or dispersion values can be used. Description is given by using pixel values herein.

(2) Pattern Array P

Figure 3:
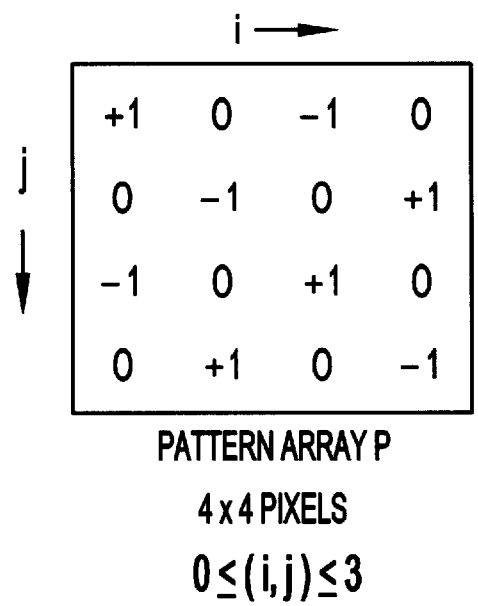
FIG. 3 is a pattern array consisting of 4×4 pixels.

A pattern array P expressed by a plurality of array elements indicates a pattern for adding a plurality of array elements existing in a predetermined region of the data array. Individual array elements in the predetermined region are added according to the values of array elements in a locationally corresponding pattern array. The array element in the pattern array P includes at least a positive unit value (for example, "+1") and a negative unit value (for example, "−1"). In case where the data is two-dimensional data such as image data, the pattern array P is a two-dimensional array in which a plurality of array element each having a predetermined value are arranged in a matrix. FIG. 3 shows a pattern array consisting of 4×4 array elements. In the figure, "+1" represents the positive unit value, while the symbol "−1" represents the negative unit value, the positive and negative unit values being uniformly dispersed and arranged. In addition, the value of array element other than those for which these unit values are assigned is zero. The reason why zero is assigned is to suppress deterioration of image quality from the embedding operation by reducing the difference between values of adjacent array elements.

Here, the pattern array must satisfy the relationship of the following equation:

$$\sum_{i,j} P(i, j) = 0 \qquad \text{[Equation 2]}$$

That is, it is necessary that the sum total of values of all array elements in a pattern array P is zero. In the example of FIG. 3, since there are four positive unit values and four negative unit values, their sum total is zero. This algorithm is to extract embedded information by using a statistical approach. It is important that the sum total is zero to guarantee the statistical character in extraction.

(3) Embedding of Information

Positions of (N) number of hiding regions are defined in the media array. The hiding region has a size corresponding to that of the pattern array P, and consists of 4×4 array elements. Here, the number N should be sufficiently large so that the statistical character appears, as described later. Specifically, the hiding region may be a predetermined region independent from the image data or the like, or adaptively determined depending on the content of image data.

In the following, (N) number of hiding regions are assumed to be previously determined at the positions shown in FIG. 4. That is, the 640×480 data array as shown in FIG. 2 is divided into a lattes of 4×4 hiding regions. This can provide (N) number of hiding regions (N=19200 in this example). The position of a hiding region can be expressed by a position (x, y) at the upper left corner of the hiding region (hereinafter called the "reference position of hiding region") and an amount of offset (i, j) with reference to such position. For example, the upper left hiding region $21a$ can be expressed as I (1+i, 1+j) with reference to the upper left array element I (1, 1) $22a$ where $0 \leq i, j < 3$. Similarly, the hiding regions $21b$ and $21c$ can be expressed as I (5+i, 1+j) and I (633+i, 1+j), respectively. When this is generalized, a hiding region can be expressed as follows:

Hiding region I (x+1, y+j)

(x, y): reference position of hiding region (i, y): amount of offset (0<i, j<3)

The value of reference position (x, y) is that for the upper left array element of the hiding region, and has a discrete value on every fifth number.

Then, the value of each array element in (N) number of hiding regions subject to the embedding operation is treated by using a predefined hiding rule. The hiding rule defines how the pattern array is applied to the hiding region in correspondence to the meaning of information to be embedded. That is, it defines which of the positive or negative unit value is added to the value of array element in the hiding region based on the positive and negative unit values in the pattern array. This is described in detail according to the hiding rule defined as follows:

| (Hiding rule) | |
|---|---|
| Information to be embedded | Application of pattern array to (N) number of hiding regions |
| Permission for copying image data (unconditional) | No pattern array being applied |
| Inhibiting copying of | Sign relationship of pattern array |

| -continued | |
|---|---|
| (Hiding rule) | |
| Information to be embedded | Application of pattern array to (N) number of hiding regions |
| image data Permission for copying image data (only once) | being applied as it is Sign relationship of pattern array being inverted and applied |

According to the hiding rule defined as above, when no limitation is provided on copying of image data, no treatment is performed on the image data based on the pattern array. Therefore, it is sufficient to distribute the original data array I as it is.

Then, when it is intended to inhibit copying of the image data, the sign relationship of pattern array is applied as it is, and the adding operation represented by the following equation is performed. That is, adding of array elements which is convolution of the pattern array P is performed for respective hiding regions. In other words, a predetermined value is added to each of array elements constituting the hiding region according to the unit value of the pattern array. The predetermined value is determined according to the unit value in the pattern array locationally corresponding to a array element.

[Equation 3]

$$I'(x+i, y+j) = I(x+i, y+j) + P(i, j) \; (x: 1,5,9, \ldots, 637\; y: 1,5,9, \ldots, 477\; 0 \leq (i, j) \leq 3)$$

Figures 4, 7:
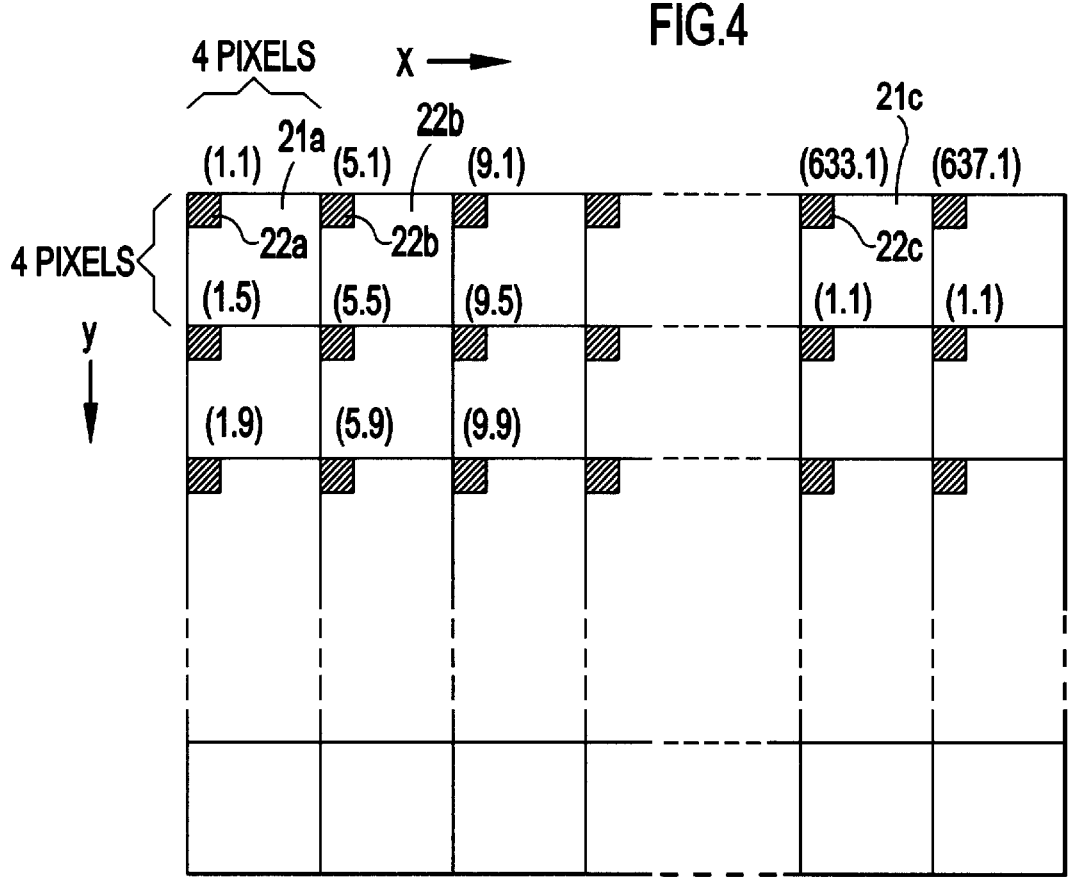
FIG. 4 is (N) number of hiding regions specified in image data as a lattice.
FIG. 7 is calculation of a block value F (1, 1) with respect to a hiding region I' (1+i, 1 +j) at the upper left corner of the screen.

FIG. 5 illustrates the convoluting operation by applying the pattern array P to the hiding region I (1+i, 1+j) $21a$ of FIG. 4 as it is. The positive unit value "+1," the negative unit value "−1," and the value "0" indicate that amount of operation "+1," "−1," and "0" is added to the values of corresponding hiding regions as the array position, respectively. That is, the positive unit value "+1" in the pattern array P is added to four pixel values of $a_{11}$, $a_{42}$, $a_{33}$, and $a_{24}$ in the hiding region I locationally corresponding to the unit value "+1." In addition, the negative unit value "−1" in the pattern array P is added to four pixel values $a_{31}$, $a_{22}$, $a_{13}$, and $a_{44}$ corresponding to the negative unit value "−1." Moreover, remain unchanged are eight pixel values $a_{21}$, $a_{41}$, $a_{12}$, $a_{32}$, $a_{23,}$ $a_{43}$, $a_{14}$, and $a_{34}$ corresponding to the value "0" in the pattern array P.

Such convolution is performed on (N) number of hiding regions. This enables it to obtain a data array I' that information "inhibit copying of image data" is embedded in (N) number of hiding regions. It should be noted here that information "inhibit copying of data" is expressed by a number of hiding regions as a whole by convoluting the pattern array on these hiding regions. In other words, this means that the information "inhibit copying of data" cannot be extracted by only one hiding region to which the embedding operation is performed, details of which are described later.

For the data array I', although element values are operated in a number of hiding regions according to the pattern array, amount of operation is vary small for individual values. Accordingly, there is little difference between the data array I' values in which are operated and the original data array I.

In a case where it is intended that copying of image data is permitted only once, and inhibited thereafter, the pattern array is convoluted after its sign relationship is inverted. That is, the pattern array is applied after converting the positive unit value "+1" to the negative unit value "−1," and vice versa. Application of the pattern array after it is inverted is equivalent to performing the subtraction operation as represented by the following equation.

[Equation 4]

$$I'(x+i, y+j)=I(x+i, y+j)-P(i, j)(x: 1,5,9, \ldots, 637\ y: 1,5,9, \ldots, 477\ 0\leq(i,j)\leq 3).$$

In this processing, the positive unit value "+1," the negative unit value "−1," and the value "0" indicate amount of operation "−1," "+1" and "0" are added to that values in the hiding region locationally corresponding to the array, respectively. Such convolution is performed on (N) number of hiding regions. This completes to embed information "permission of copying image data (only once)" into (N) number of hiding regions.

It should be noted again that, since information "inhibit copying of data (only once)" is expressed by a number of hiding regions as a whole by convoluting the pattern array on these hiding regions, the information "inhibit copying of data (only once)" cannot be extracted by only one hiding region to which the embedding operation is performed.

(4) Extraction of Embedded Information

To extract the embedded information, the following information should be known. The feature of the present invention lies in that the information can be extracted without knowing the original data array I.

Figures 6, 10:
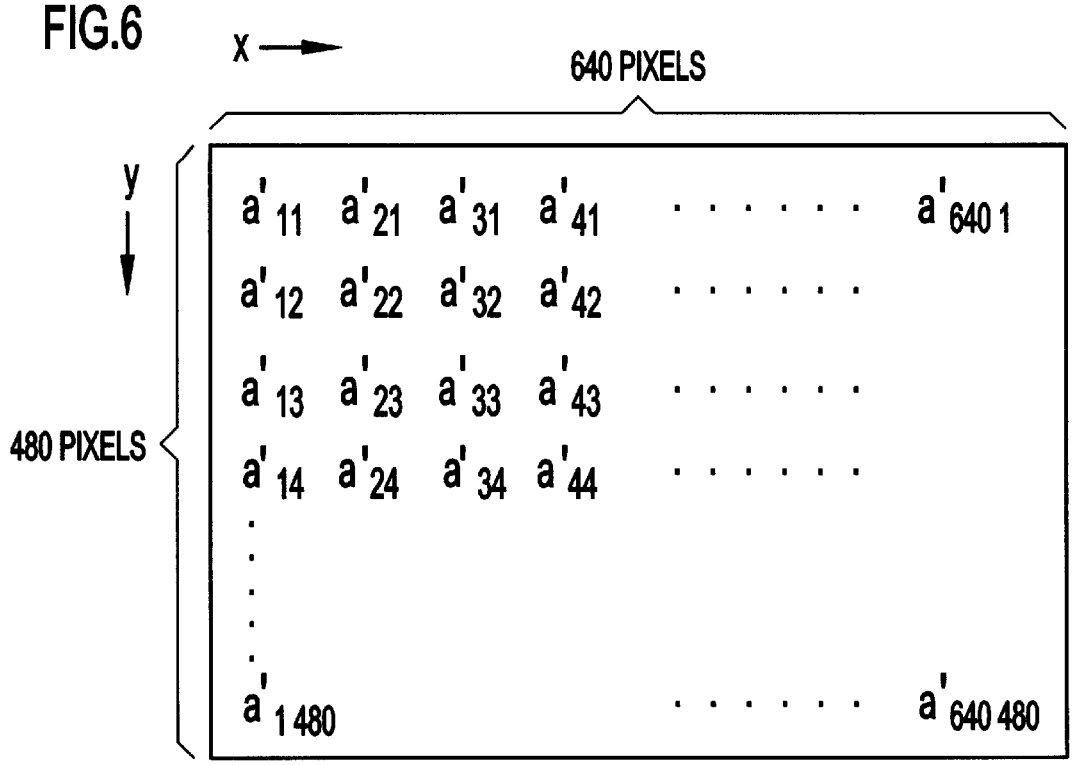
FIG. 6 is a state of data array I' (x,y) in which what information is embedded is unknown.
FIG. 10 is a graph showing a pattern array of 8×8 pixels in which array elements are arranged in 2×2 pixels.

(a) Data array I' embedded with information:
(b) Pattern array P:
(c) Offset position (x, y) of (n) number of hiding regions: and
(d) Extraction rule corresponding to the hiding rule Since the data array I' of the above information (a) visually little differs from the original data array I, the extracting person does not know what information is embedded. FIG. 6 shows the state of data array I' (x, y) in which what information is embedded is not known. Each array element $a'_{xy}$ may or may not be operated for its value based on the hiding rule. In addition, as for the above information (b), (c) and (d), if they are already stored in a semiconductor memory of an extraction system such as a DVD player, the extracting person is not necessarily to enter such information every time he or she attempts extraction. In such case, it is sufficient to enter only the data array I' into which the information is embedded for extraction. In the description that follows, it is assumed that the information (b) and (c) are known, and the information (d) is extracted according to the following rule. The statistical judgment value D and the reliability distance K will be described later.

(Extracting rule)

| Statistical judgment value D | Information to be extracted |
| --- | --- |
| 0 | Permission of copying image data (no limitation) |
| Reliability distance K | Inhibit copying of image data |
| Reliability distance −K | Permission of copying image data (only once) |

To extract the information, (n) number of hiding regions (n≦N) existing in the obtained data array I' are identified on the basis of the known information (b) and (c). The position and size of each hiding region can be identified the reference position (x, y) which is the reference position of the hiding region and an amount of offset (i, j) which indicates the size of the hiding region (see FIG. 4). Each hiding region is expressed as I' (x+i, y+1). While the (n) number should be sufficient to appear statistical character, description here is given by assuming that it is the same as N (=19200) identified in embedding.

Then, as represented by the following equation, a block value F (x, y) (scalar value) is obtained by calculating the convolution between a hiding region I' (x+i, y+j) and the pattern array shown in FIG. 3.

$$F(x, y) = \sum_{i,j} I'(x+i, y+j) \times P(i, j) \quad \text{[Equation 5]}$$

FIG. 7 illustrates the calculation of block value F (1, 1) for the hiding region I' (1+i, 1+j) at the upper left corner of the screen (the hiding region 21a in FIG. 4). The block value F (1, 1) is obtained by obtaining a product of the value of each array element in the hiding region and the value of pattern array locationally corresponding to the element, and summing respective products. In the figure, "+" indicates a positive unit value, while "−" indicates a negative unit value. (n) number of block values are obtained by determining such convolution for (n) number of hiding regions. Then, as represented by the following equation, a statistical judgment value D which is an index of information extraction is obtained by determining an average of (n) number of block values F (x, y). The statistical judgment value D is to judge in term of the statistical character whether or not the pattern array is convoluted in the data array, and, if convoluted, in which state the pattern array is applied.

$$D = \frac{1}{N} \sum_{x,y} F(x, y) \quad \text{[Equation 6]}$$

First, when the pattern array P is not convoluted, that is, when the data array I' is the data array I itself, it is expected that the statistical judgment value D converges to zero. In this case, the Equation 6 can be developed as follows:

$$\begin{aligned} D &= \frac{1}{N} \sum_{x,y} F(x, y) \quad \text{[Equation 7]} \\ &= \frac{1}{N} \sum_{x,y} \sum_{i,j} I'(x+i, y+j) \times P(i, j) \\ &= \frac{1}{N} \sum_{x,y} \sum_{i,j} I(x+i, y+j) \times P(i, j) \\ &\to 0 \end{aligned}$$

Here, each array element in the original data array I may take various values (values in a range of 0 to 256 for pixel values). In addition, the sum total of the positive and negative unit values is zero, and the positive and negative unit values are uniformly distributed. Therefore, if there is no correlation between the arrangement in the original data array I (x, y) and the pattern array P (i, j), it can be expected that the statistical judgment value D which is an average of convolution of them (block values F) becomes zero. That is, since the sum total of the positive unit value "+1" and the negative unit value "−1" in the pattern array is zero, the statistical judgment value D can be converged to zero by obtaining block values F (x, y) in the number sufficient to appear statistical character, and averaging them. However, when the hiding regions are convoluted on the basis of the pattern array, as described later, the statistical judgment value cannot converge to zero. Since, when the judgment value D converges to zero, it is judged to be a phenomenon occurring when the pattern array is not embedded, the information "Permission of copying image data (no limitation)" is extracted according to the extraction rule.

Then, when the pattern array P is convoluted as it is, the Equation 6 for obtaining the statistical judgment value D can be developed as follows:

$$D = \frac{1}{N}\sum_{x,y} F(x, y) \quad \text{[Equation 8]}$$

$$= \frac{1}{N}\sum_{x,y}\sum_{i,j} I'(x+i, y+j) \times P(i, j)$$

$$= \frac{1}{N}\sum_{x,y}\sum_{i,j} (I(x+i, y+j) + P(i, j)) \times P(i, j)$$

$$= \frac{1}{N}\sum_{x,y}\sum_{i,j} (I(x+i, y+j) \times P(i, j) + P(i, j))$$

$$\rightarrow K$$

In the equation, the first right item becomes zero as described for the Equation 7. In addition, the second right item becomes a constant because it is convolution to the pattern array P itself. In this case, it becomes the number of elements K of the unit values (both positive and negative unit values). The number of elements K is hereinafter called reliability distance. Since the pattern array shown in FIG. 3 has four positive unit values "+1" and four negative unit values "−1," the reliability distance K is a constant of 8 (K=((+1)*(+1))*4+((−1)*(−1))*4=8). Since the reliability distance K does not basically depend on the value of array elements in the data array or (n) number of the hiding regions, its average also becomes the reliability distance K itself. Therefore, the case where the judgment value D becomes K is a unique case where the pattern array is convoluted as it is (without inverting the unit values for their positive and negative signs), so that the information "inhibit copying of image data" is extracted according to the extraction rule.

In addition, when the pattern array P is inverted and convoluted, the Equation 6 for obtaining the statistical judgment value D can be developed as follows based on the Equation 4:

$$D = \frac{1}{N}\sum_{x,y} F(x, y) \quad \text{[Equation 9]}$$

$$= \frac{1}{N}\sum_{x,y}\sum_{i,j} I'(x+i, y+j) \times P(i, j)$$

$$= \frac{1}{N}\sum_{x,y}\sum_{i,j} (I(x+i, y+j) + P(i, j)) \times P(i, j)$$

$$= \frac{1}{N}\sum_{x,y}\sum_{i,j} I(x+i, y+j) \times P(i, j) - K$$

$$\rightarrow -K$$

As seen from this equation, since the pattern array is inverted and convoluted, the resulting statistical judgment value D becomes a value −K. Therefore, convergence of the judgment value D to the value −K is a unique case occurring when the pattern array is inverted and convoluted (that is, the unit values are inverted for their positive and negative signs), so that the information "permission of copying image data (only once)" is extracted according to the extraction rule.

As described above, whether or not the pattern array is embedded can be judged by obtaining the statistical judgment value D from an average of the block values F (x, y) in the number sufficient to appear statistical character. Specifically, the embedded information can be identified by providing suitable thresholds between 0 and the reliability distance K and between 0 and the reliability distance −K, and comparing the calculated statistical judgment value D with the established thresholds.

(5) Statistical Judgment Value D and Reliability Distance K

A histogram for the entire image data is produced for (N) number of block values F (x, y) calculated from (N) number of hiding regions existing in the image. That is, frequency distribution is produced for (N) number of block values. This enables it to calculate their average $\mu 1$ and standard deviation $\sigma 1$. Each block value F (x, y) is normalized by dividing it with the number of array elements (16) in the pattern array of FIG. 3. When the pixel value is within a range from 0 to 256, the normalized block value F (x, y) is distributed over a range from −64 to +64. Here, if samples in a number sufficient to appear statistical character is used, it can be expected that the average $\mu_1 \approx 0$ of block value F (x, y)$\leq 0$, or it becomes zero.

When (n) number of block values where n is smaller than N are randomly selected from the block values F (x, y), it is known that the average $\mu_n$ and the standard deviation $\sigma_n$ are as following equations for all selections:
[Equation 10]

$$\mu_n = \mu_1$$

$$\sigma_n = \sigma_1 \sqrt{n}$$

Therefore, the distribution of statistical judgment value $D = 1/n \ast \Sigma F$ can be approximated by the average $\mu_1$ and the standard deviation $\sigma 1/\Sigma n$. When the pattern array is not convoluted, the frequency distribution of the statistical judgment value D is as shown in FIG. 8. Here, if the reliability distance K is established at a value sufficiently remote from the center of distribution (average) when the pattern array is not embedded, or zero, it can be said that the center of distribution (reliability distance K, −K) obtained when the pattern is embedded is a unique phenomena in term of probability.

Although the reliability distance K is described to be a value when the pattern value is convoluted, more generally, it can be said that it is an average of amounts of operation per unit hiding region (absolute values). Then, operating the hiding region based on the array pattern shown in FIG. 3 means to operate the values of 16 array elements in the unit hiding region by eight in total. The reliability can be assured for the extracted information by determining the amount of operation per unit hiding region that provides sufficient reliability distance K. If, for example, K=6×σ is the threshold for the amount of operation per unit hiding region, it means 6×σ per unit hiding region, so that it is 6×σ×n for the entire hiding regions. The standard deviation per pixel divided by the size of pattern array (for example, 8×8) becomes about $\sigma_1$=6 in the image data of 640×480 pixel size. Therefore, since $\sigma_n$ is 0.09 if n=4900, it is theoretically sufficient to change the pixel values by about K=6×σ=0.6 per pixel. Since one half of the pattern array used here has the array element value of zero, it is sufficient to provide the amount of operation of 1.0 to 2.0 per pixel. Since the amount of addition is very small for one pixel, even if such addition is provided for each hiding region, the pattern array can be extracted with high reliability although deterioration of image quality is little noticed.

How much reliability distance K is established also depends of the characteristics of the image. Since a image of "a skein of birds in sunset" has different image characteristics from an image of "a tiger in forest," it is necessary to change the reliability distance K. Therefore, it is preferable to establish the reliability distance K, measuring σ, n for each image in view of its characteristics when embedding the image. If too long reliability distance K is established, it increases the amount of operation per unit hiding region so that the image quality is deteriorated. Accordingly, it is important to suitably establish a reliability distance K satisfying both the reliability for judging the embedded information and the suppression of deterioration of image quality.

Since the reliability distance K is an average amount of operation per unit hiding region, as long as the sum total of amount of operation for (N) number of hiding regions is constant, the magnitude of value to be added may be varied for each hiding region. That is, it may be allowed to add values "+2" and "−2" which is twice the positive and negative unit values to a hiding region, and to add values "+3" and "−3" which is triple those values to another hiding region. In addition, as long as the sum total of amount of operation for (N) number of hiding regions is constant, the magnitude of values to be added may be varied for each array element constituting the same hiding region. However, it is important in this case that the sign relationship is maintained for each unit value which the pattern array has. This is described based on FIG. 5. "+2" may be added to four array elements $a_{11}$, $a_{42}$, $a_{33}$, and $a_{24}$ corresponding to the positive unit value "+1," but "−2" with different sign from the unit value cannot be added. That is, the sign of unit value in the pattern array means that the positive unit value indicates that a positive value (although its value is arbitrary) should be added to the value of corresponding array element, and the negative unit value indicates that a negative value should be added to the value of corresponding array element. Accordingly, the Equations 3 and 4 can be extended as follows:

[Equation 11]

$$I'(x+i, y+j) = I(x+i, y+j) \pm \alpha P(i, j)$$

α: natural number

As described, deterioration of image quality can be further suppressed by varying the magnitude of value to be adaptively added. For example, smaller amount of operation is desirable for an area such as an edge of image which is visually sensitive. On the other hand, there is an are where change is visually little noticeable even if the value to be added is large. Accordingly, it is preferable to maintain the total amount of operation for all (N) number of hiding regions at constant by adaptively selecting a smaller value for a sensitive area and a larger value for a non-sensitive area.

(6) Resistance Against Signal Processing

Description is given on the resistance against various signal processing for the embedded information. FIG. 9 is a graph showing statistical judgment values D obtained when processing is performed or not with the pattern array in a case where no signal processing is provided. It shows the statistical judgment values D obtained when the pattern array is not convoluted on an image, and when the pattern array is convoluted so that the reliability distance K exceeds at least eight. 100 sample images on the axis of abscissa are different images each other, and their size is 640×480. In addition, the pattern array used is the 8×8 pattern shown in FIG. 10. This pattern array has positive unit values of 2×2 size, negative unit values of 2×2 size, and 0s uniformly distributed. In addition, the statistical judgment values on the axis of ordinate are normalized using σ for each image.

While the statistical judgment values are concentrated near 0 when no processing is performed, they are concentrated near the reliability distance +8 when processing is performed. Thus, it is judged with a high reliability whether or not the pattern array is embedded.

Figure 11:
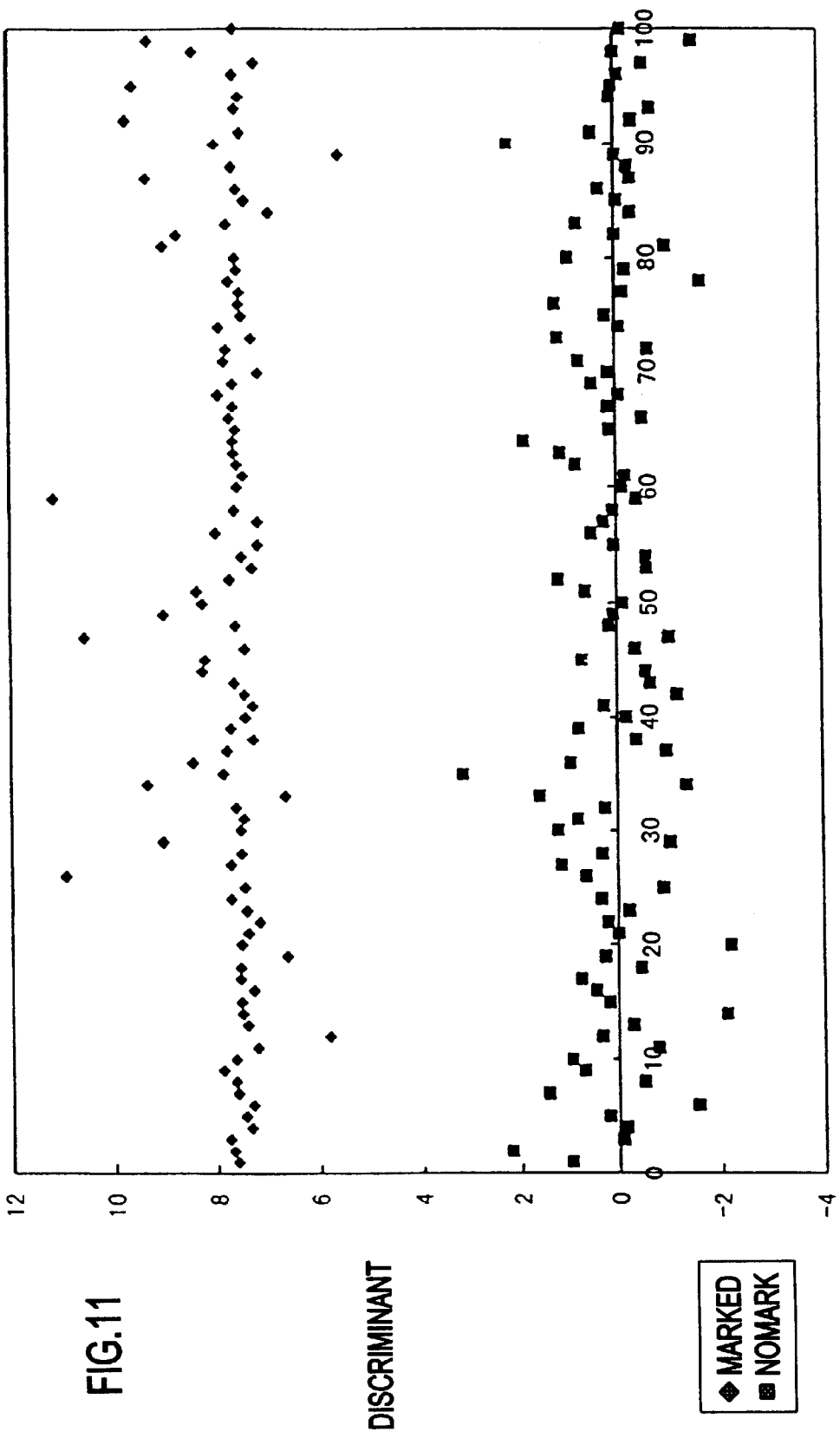
FIG. 11 is a graph showing statistical judgment values obtained when JPEG compression is performed.

FIG. 11 is a graph showing statistical judgment values obtained when JPEG compression is performed on each sample image used for FIG. 9. Although the reliability distance is slightly less than +8.0 for the statistical judgment values D when processing is performed with the pattern array, it is found that the judgment values can be judged with sufficient reliability by establishing the threshold value for judging whether or not the pattern array is embedded at around +4.0.

Figure 12:
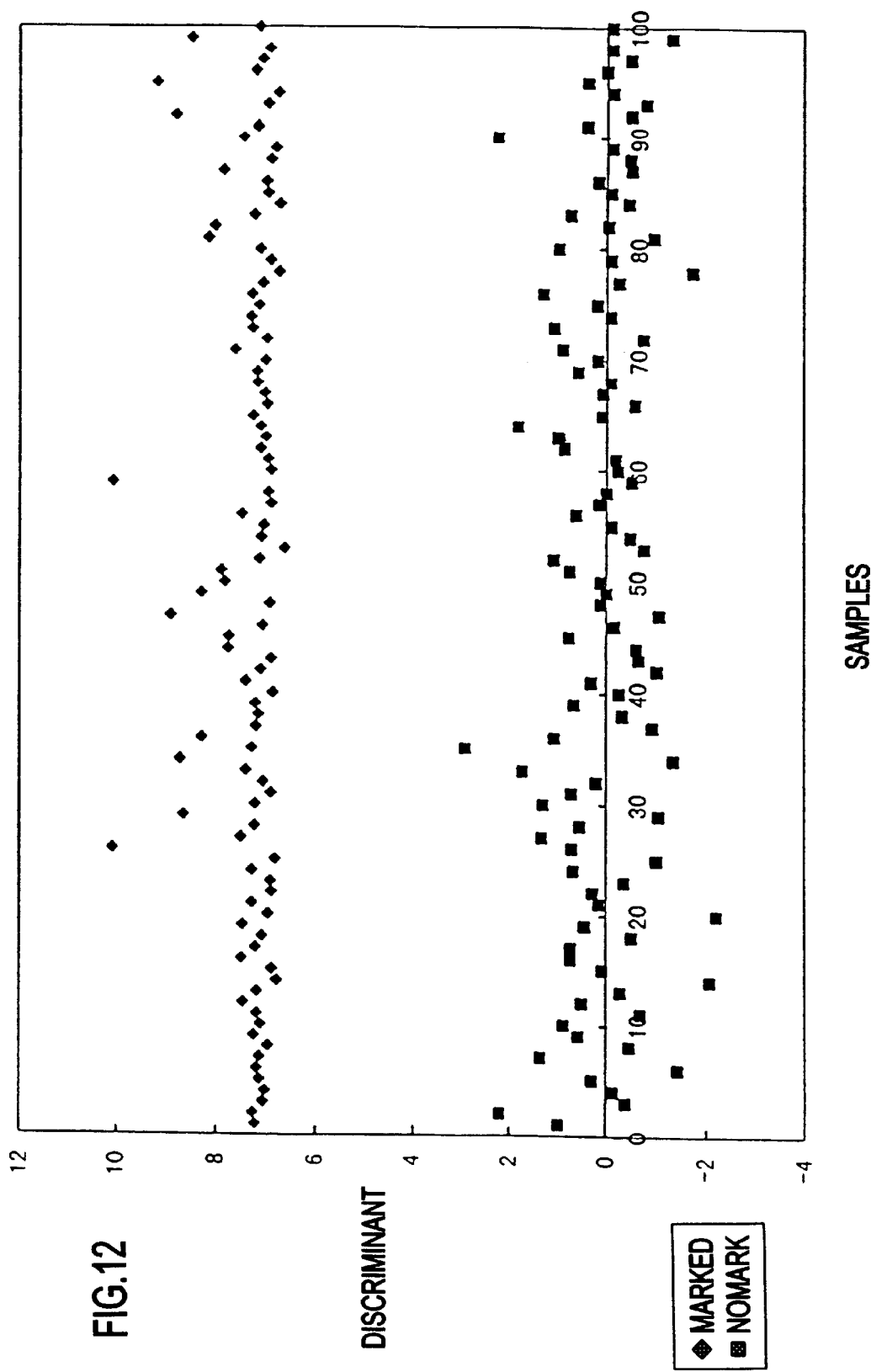
FIG. 12 is a graph showing statistical judgment values obtained when an averaging operation is performed by changing image size.

FIG. 12 is a graph showing statistical judgment values obtained when the averaging operation is performed on each image used for FIG. 9. Image detection is performed on an image which is compressed to 3/4 after an embedding operation and then expanded by 4/3. Although the reliability distance is slightly less than +8.0 for the statistical judgment values D, it is found that information can be extracted with sufficient reliability by establishing the threshold value at around +4.0.

Figure 13:
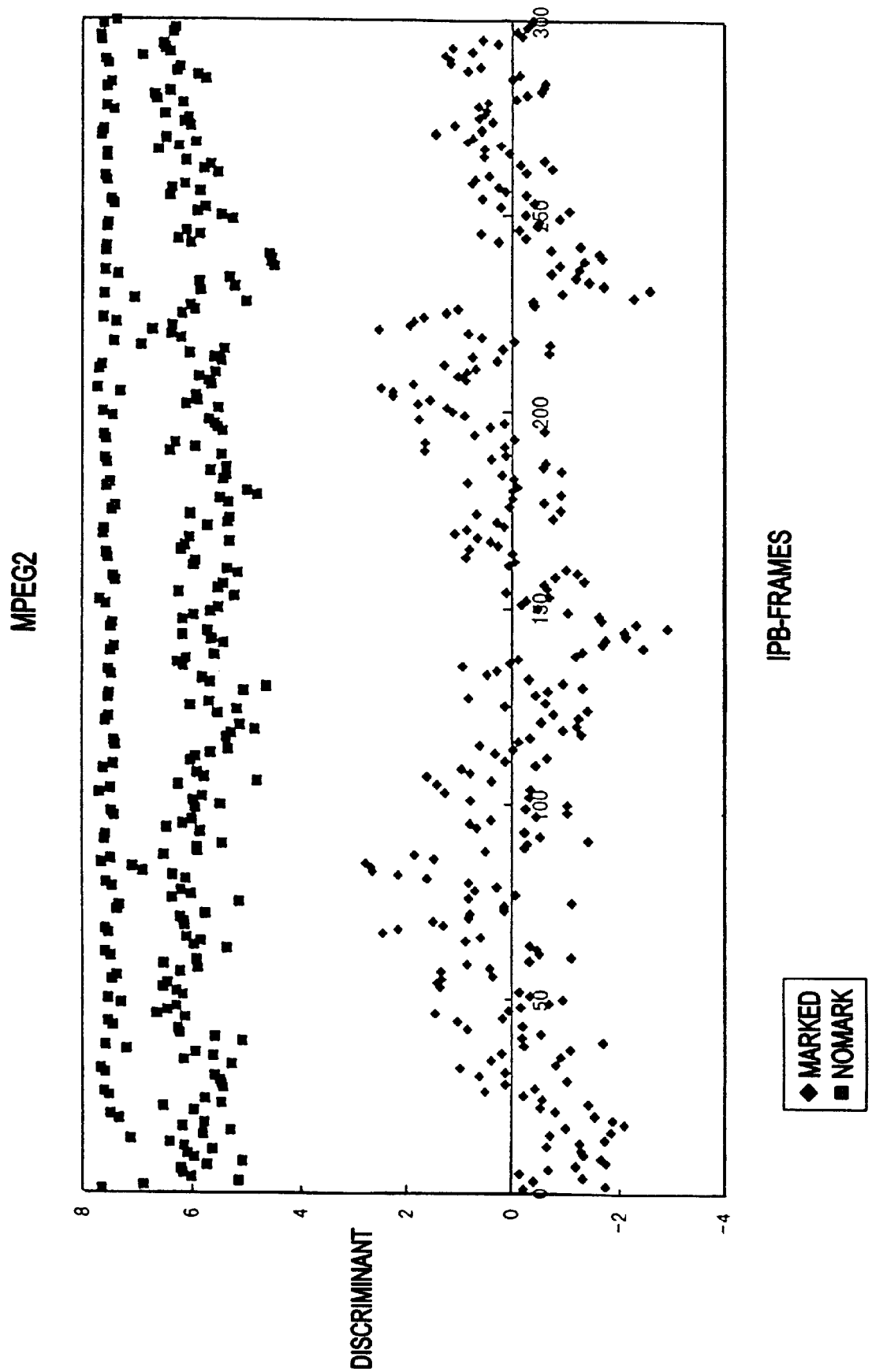
FIG. 13 is a graph showing resistance against data compression with MPEG2.

FIG. 13 is a graph showing statistical judgment values obtained when MPEG2 operation is performed. The statistical judgment values are obtained by performing compression after embedding information into continuous interlace 150 frames as samples. One frame is 720×480. Although the statistical judgment value (when pattern processing is performed) obtained from B frame composed of differential information is smaller than those of I and P frames, and concentrated around +6.0, it is found that information can be extracted with sufficient reliability by establishing the threshold value at around +4.0.

As seen from the above experiment results, it is found the information embedded by using this algorithm has sufficient resistance against various signal processing which is generally performed on digital information.

While the above description given for a case where one information is embedded in only one frame, one information may be embedded in a plurality of frames. For example, 100 hiding regions are determined for one frame, and one information may be embedded in hiding regions for 10 frames (1000 hiding regions). How many hiding regions are prepared significantly depends on the size of pattern array and setting of value for the reliability distance K. When the size of pattern array is increased, the reliability distance can be assured with less amount of operation for individual pixel values. However, hiding regions should be prepared over many frames. Accordingly, it is important that a best reliability distance K is established by taking various factors into account.

Thus, this algorithm determines in data array hiding regions in the number sufficient to appear statistical character, and performs convolution of a pattern array on them in accordance with a hiding rule, or addition operation corresponding to the value of array element. In extraction, examination is performed on the average of convolution between the hiding regions in the obtained data array and the weight of the pattern array. Since the average varies depending on the convolution state due to the statistical character, this value enables it to detect whether or not the pattern array is convoluted including the convolution state. The embedded information can be identified from this value by referring to the extraction rule corresponding to the hiding rule.

EXAMPLE

Description is given on a data hiding system for DVD-ROM using the above method.

Figure 14:
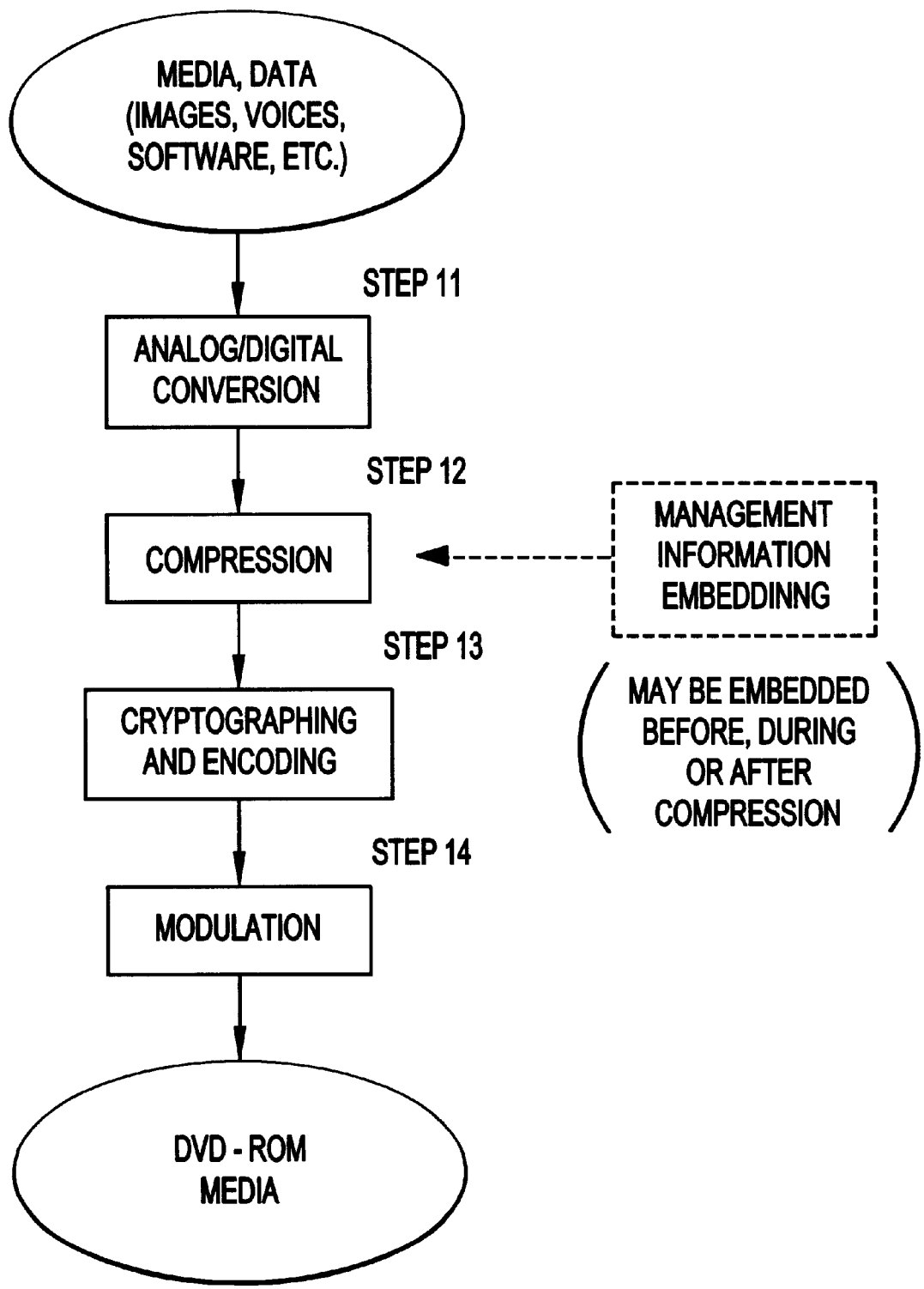
FIG. 14 is a procedure for recording data in a medium.

FIG. 14 is a procedure for recording data in a recording medium. Data such as images, audio, or software is recorded in a DVD-ROM medium according to the following procedure. Data that is analog data is converted into digital data through analog/digital conversion (step 11). The resulting digital data is compressed by using, for example, MPEG (Moving Picture Experts Group) (step 12). The compressed data is further coded and encrypted (step 13), and modulated (step 14) for recording on the DVD-ROM medium.

In this example, the data is recorded in the DVD-ROM before, during or after control information is compressed. The control information is for restricting access to data stored in the DVD-ROM when a system accesses such data. The system is controlled under this control information.

Embedding of control information is carried out according to the data hiding technique of the present invention. That is, this system comprises first storage for storing a data array, and a second storage for storing a pattern array, the pattern array consisting of a plurality of array elements, the pattern array having at least a positive unit value and a negative unit value, the sum total of the positive and negative unit values being zero. In addition, it further comprises a unit for specifying in the data array (N) number of hiding regions into which certain information is embedded, each region having a size corresponding to that of the pattern array. Furthermore, it comprises an operation unit for determining an amount of operation for each of the array elements according to the locationally corresponding positive or negative unit value with respect to one of the specified (N) number of hiding regions, by referring to a hiding rule providing the correspondence between the information and an application of the pattern array to the hiding region, and for adding the determined amount of operation to each of the array elements with respect to the hiding region. Such system enables it to embed certain information into the (N) number of hiding regions.

Figure 1A:
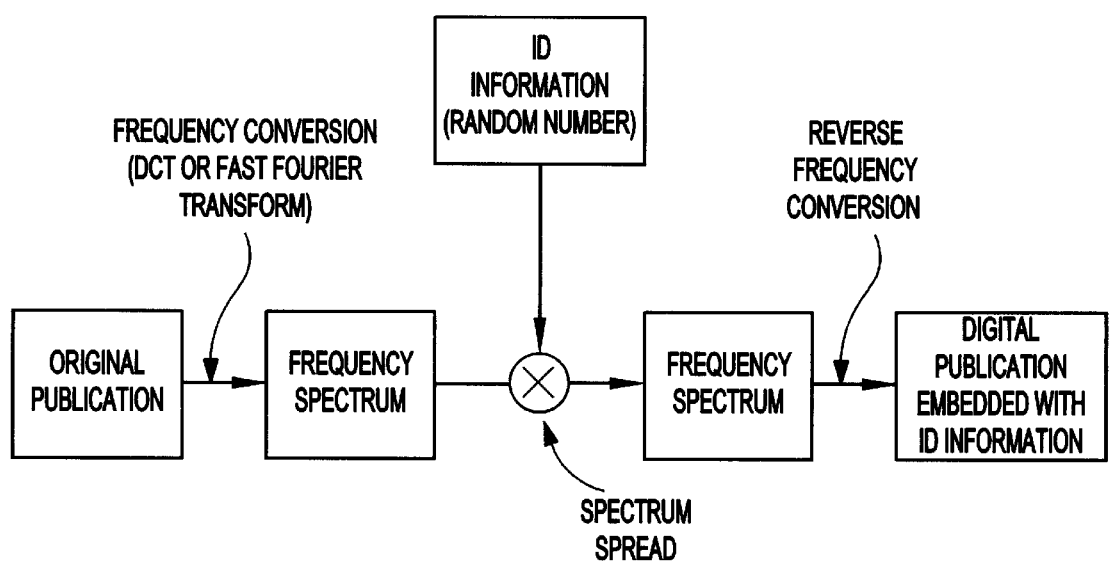
FIGS. 1A and 1B are block diagrams illustrating a process for embedding ID information and extracting ID information respectively in accordance with background art.
Figure 1B:
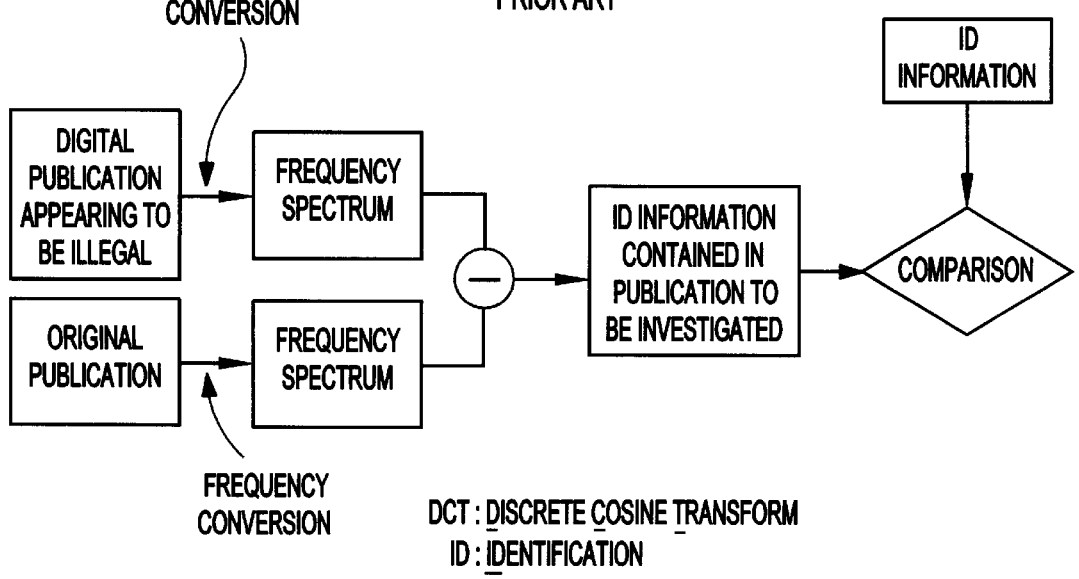

The control information is embedded in this manner. The data recorded in the DVD-ROM is accessed according to the following procedure. First, data is read from the DVD-ROM. The read out data is, as described in conjunction with FIG. 1, a signal obtained by MPEG compressing (step 11), coding and encrypting (step 12), and then modulating (step 14) data embedded with the control.

Figure 15:
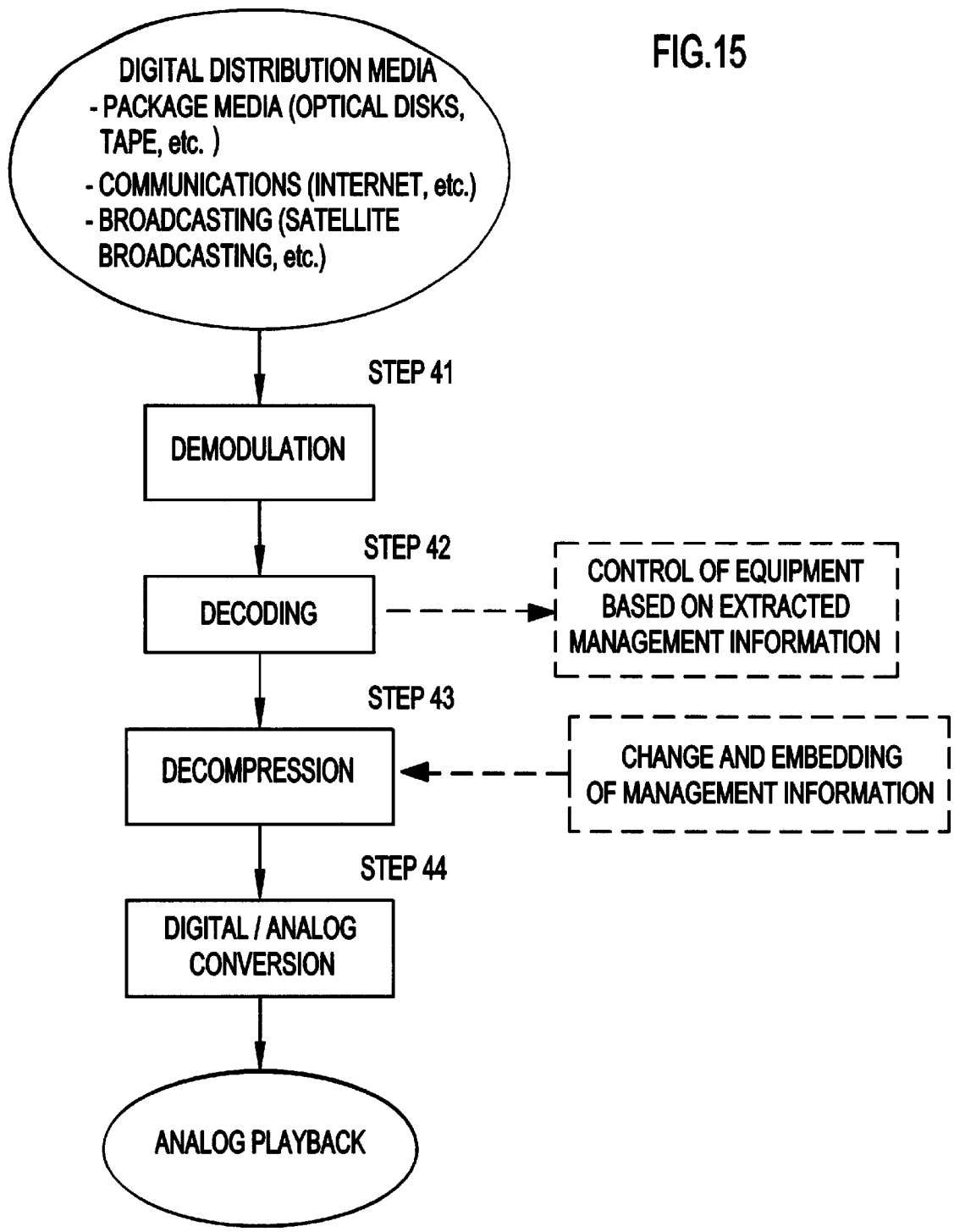
FIG. 15 is a procedure for controlling playback of recorded data.

FIG. 15 is a procedure for controlling accessing to data. First, data embedded with information is supplied to an access system. The source of data is, for example, a recording medium such as a DVD-ROM or CD-R, communication such as internet, or satellite broadcasting. The supplied data is demodulated (step 41), and decoded (step 42). If the data is MPEG compressed, it is decompressed (step 43). Control information embedded in the data is extracted, and modified for its content, if required, and only necessary modification is embedded into the data again.

A circuit for extracting control information from the data input in the recorder comprises:

(a) a circuit for specifying (n) number of hiding regions in which information is embedded in the data array, the (n) number being sufficient to appear statistical character, the hiding region having a size corresponding to that of a pattern array, the pattern array having a plurality of array elements, and having at least a positive unit value and a negative unit value, the sum total of the positive and negative unit values being zero;

(b) a circuit for calculating a block value by convoluting the pattern array to the hiding region with respect to each of the (n) number of the hiding regions, and obtaining a statistical judgment value from the sum of (n) number of block values; and (c) a circuit for judging embedded information according to the statistical judgment value by referring to an extracting rule providing a correspondence between the statistical judgment value and meaning of information which should be extracted.

First, a hiding region embedded with the control information is specified from the read out data. Then, the control information is extracted according to the state of hiding region by referring to the extraction rule correlating the state of hiding region with the content of data to be extracted.

Figure 16:
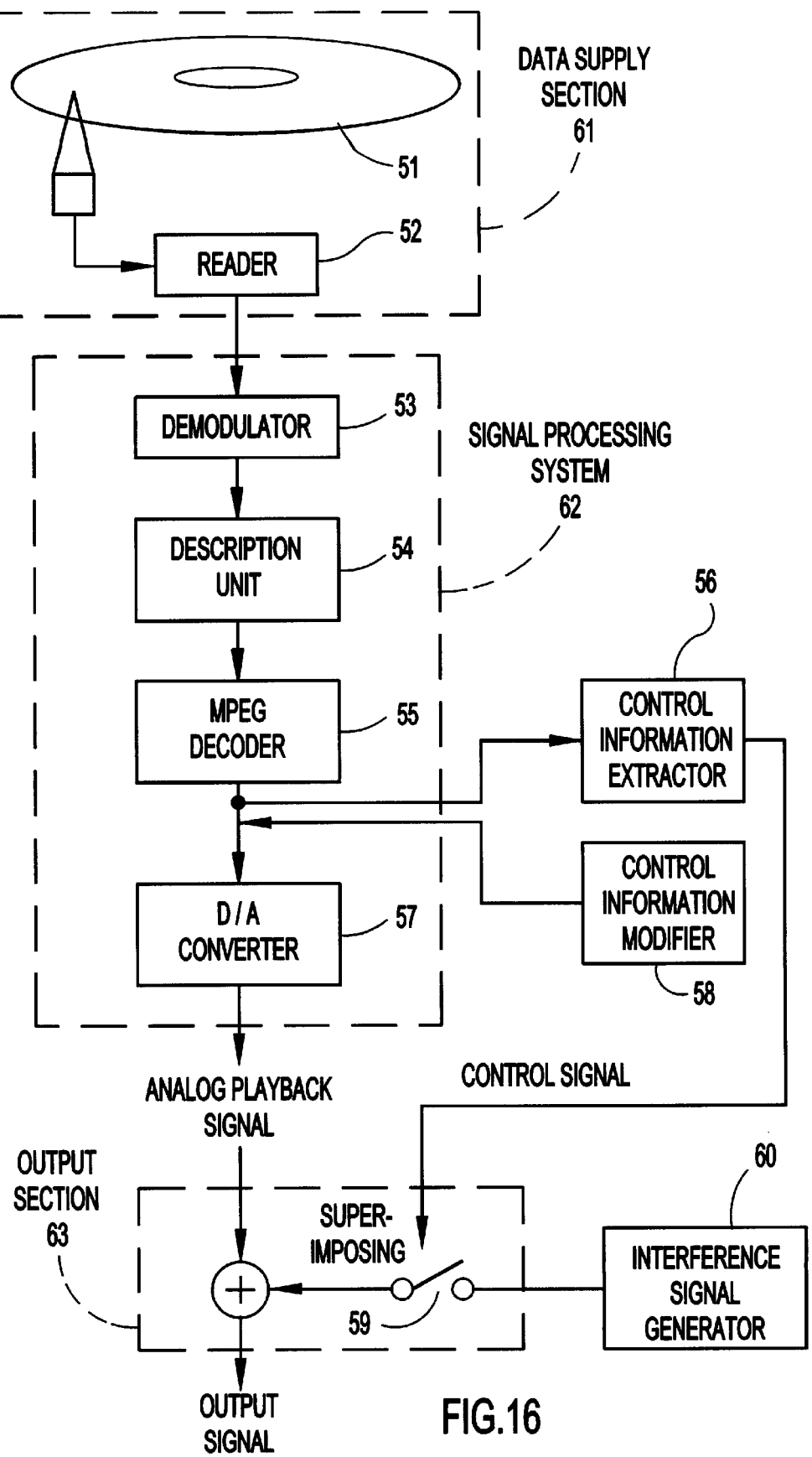
FIG. 16 is a block diagram of a system for controlling access to data, and outputting it.

FIG. 16 is a block diagram of a playback system for data stored in a DVD-ROM. A DVD-ROM 51 loaded in a data supply section 61 stores data embedded with control information using the data hiding technology as described above. The data is read by a reader 52 in the data supply section 61, and processed by a demodulator 53, a decryption unit 54, and an MPEG decoder 55, all of which constitute a signal processing system 62. Thus, decompressed digital data is obtained.

A control information extractor 56 identifies a hiding region embedded with the control information from the decompressed digital data that is the output of the MPEG decoder 55 (or, directly from MPEG data), and extracts the control information according to the state of hiding region by referring to the extraction rule correlating the state of hiding region with the content of data to be extracted. (It should be noted here that the control information can be extracted before or after MPEG decompression.)

A D/A converter 57 in the signal processing system 62 analog converts the digitized data from which the control information is removed, and outputs an analog playback signal (for example, NTSC). In addition, an interference signal generated by an interference signal generator 60 (for example, APS or Analogue Protection System of Macrovision Signal or the like) is selectively superimposed on the analog playback signal by a switch 59 in an output section 63. The switch 59 is controlled by a control signal from a control information extractor 56. The output section 63 outputs the analog playback signal or a superimposed signal as an analog output signal.

In this system, when the control information extracted by the control information extractor 56 permits duplication of data, the control information extractor 56 outputs a control signal turning off the switch 59. In this case, the interference signal is not superimposed on the analog playback signal, and the analog playback signal is output as is.

On the other hand, when the control information inhibits duplication of data, the control information extractor 56 outputs a control signal turning on the switch 59. In this case, the output is a signal that is an analog signal from the D/A converter 57 superimposed with an interference signal generated by the interference signal generator 60. When a movie is intended to be displayed on a monitor based on the signal superimposed with the interference signal, it can be normally displayed on the monitor without affected by the interference signal because of the property of the monitor. However, when it is intended to record the movie using a digital VTR having an analog input terminal, it is affected by the interference signal, and the movie cannot be normally recorded. Therefore, the movie can be reproduced from the signal superimposed with the interference signal, but cannot be digitized and recorded, so the duplication of data can be effectively prevented.

Furthermore, in addition to basic control information, additional information may be employed for more finely controlling copying (duplication) and playback. This enables it to easily attain flexible control for the type of recording/playback medium (ROM, RAM, or R type).

It is obvious that the control information described above is not limited to information for restricting duplication, but may be applied to various control information for controlling a system. For example, it can be appropriately used for other control including restriction on access equipment, restriction of access users, available period of data, authentication information, without departing from the spirit of the present invention.

[Advantages of the Invention]

Thus, the present invention enables it to extract embedded information without providing original data as information, and to extract the information with relatively low calculation cost because no complicated operation such as frequency conversion is required.

What is claimed is:

1. A data hiding method for embedding information into a data array, said data array comprising a plurality of array elements, said method comprising the steps of:
   (a) preparing a pattern array having a plurality of array elements, said pattern array having at least a positive unit value and a negative unit value, and the sum total of said positive and negative unit values being zero;
   (b) specifying (N) number of hiding regions in said data array into which regions certain information is embedded, said hiding region having a size corresponding to that of said pattern array;
   (c) determining an amount of operation for each of said array elements according to the locationally corresponding positive or negative unit value with respect to one of said hiding regions, by referring to a hiding rule providing the correspondence between the meaning of information and an application of said pattern array to the hiding region;
   (d) adding the determined amount of operation to each of said array elements with respect to said hiding region; and
   (e) performing the steps (c) to (d) with respect to the (N) number of said hiding regions so that information is embedded into (N) number of said hiding regions.

2. A method for extracting embedded information from a data array comprising a plurality of array elements, the method comprising the steps of:
   (a) specifying (n) number of hiding regions in which information is embedded in said data array, said hiding region having a size corresponding to that of a pattern array, the pattern array having a plurality of array elements, and having at least a positive unit value and a negative unit value, the sum total of said positive and negative unit values being zero;
   (b) calculating a block value by convoluting said pattern array to said hiding region with respect to each of said (n) number of said hiding regions, and obtaining a statistical judgment value from the sum of (n) number of block values; and
   (c) extracting embedded information according to the statistical judgment value by referring to an extracting rule providing a correspondence between the statistical judgment value and meaning of information which should be extracted.

3. A data hiding system for embedding information in a data array comprising a plurality of array elements, the system comprising:
   (a) a unit for preparing a pattern array having a plurality of array elements, said pattern array having at least a positive unit value and a negative unit value, and the sum total of said positive and negative unit values being zero;
   (b) a unit for specifying (N) number of hiding regions in said data array into which regions certain information is embedded, said hiding region having a size corresponding to that of said pattern array;
   (c) a unit for determining an amount of operation for each of said array elements according to the locationally corresponding positive or negative unit value with respect to one of said hiding regions, by referring to a hiding rule providing the correspondence between the meaning of information and an application of said pattern array to the hiding region;
   (d) a unit for adding the determined amount of operation to each value of said array elements with respect to said hiding region; and
   (e) a unit for operating the units (c) to (d) with respect to the (N) number of said hiding regions so that information is embedded into (N) number of said hiding regions.

4. A system for extracting embedded information from a data array comprising a plurality of array elements, the system comprising:
   (a) a unit for specifying (n) number of hiding regions in which information is embedded in said data array, said hiding region having a size corresponding to that of a pattern array, the pattern array having a plurality of array elements, and having at least a positive unit value and a negative unit value, the sum total of said positive and negative unit values being zero;
   (b) a unit for calculating a block value by convoluting said pattern array to said hiding region with respect to each of said (n) number of said hiding regions, and obtaining a statistical judgment value from the sum of (n) number of block values; and
   (c) a unit for extracting embedded information according to the statistical judgment value by referring to an extracting rule providing a correspondence between the statistical judgment value and meaning of information which should be extracted.

5. A system for embedding information into data, the information controlling access to said data, said data comprising a plurality of array elements, the system comprising:
   (a) a unit for preparing the control information to be embedded;
   (b) a unit for preparing a pattern array having a plurality of array elements, said pattern array having at least a positive unit value and a negative unit value, and the sum total of said positive and negative unit values being zero;
   (c) a unit for specifying (N) number of hiding regions in said data array into which regions said control information is embedded, said hiding region having a size corresponding to that of said pattern array;
   (d) a unit for determining an amount of operation for each of said array elements according to the locationally corresponding positive or negative unit value with respect to one of said hiding regions, by referring to a hiding rule providing the correspondence between the meaning of control information and an application of said pattern array to the hiding region;
   (e) a unit for adding the determined amount of operation to each value of said array elements with respect to said hiding region; and (f) a unit for operating the units (c) to (d) with respect to the (N) number of said hiding regions so that information is embedded into (N) number of said hiding regions.

6. A system for extracting embedded control information from data, and controlling access to said data, said data comprising a plurality of array elements, the system comprising:

(a) a unit for specifying (n) number of hiding regions in which information is embedded in said data array, said hiding region having a size corresponding to that of a pattern array, the pattern array having a plurality of array elements, and having at least a positive unit value and a negative unit value, the sum total of said positive and negative unit values being zero;

(b) a unit for calculating a block value by convoluting said pattern array to said hiding region with respect to each of said (n) number of said hiding regions, and obtaining a statistical judgment value from the sum of (n) number of block values;

(c) a unit for extracting embedded control information according to the statistical judgment value by referring to an extracting rule providing a correspondence between the statistical judgment value and meaning of control information which should be extracted; and (d) a unit for controlling access to said data according to the extracted control information.

* * * * *